Nov. 23, 1926.  
P. W. CHARTON  
1,608,301  
DEVICE FOR PROJECTING THE DIFFERENT POSITIONS OF STARS  
Filed April 21, 1925
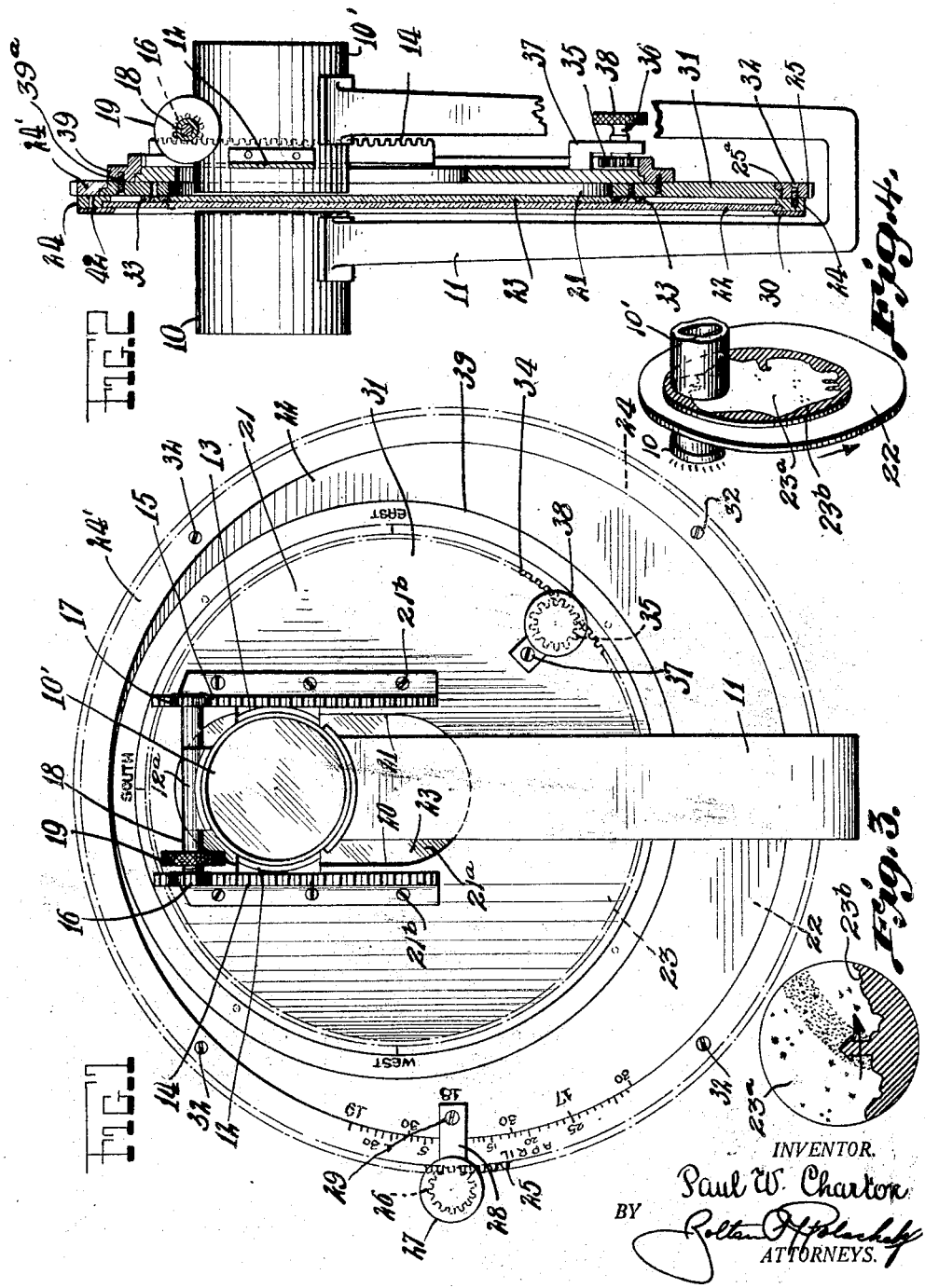
INVENTOR.  
Paul W. Charton  
BY  
ATTORNEYS.

Patented Nov. 23, 1926.

1,608,301

UNITED STATES PATENT OFFICE.

PAUL W. CHARTON, OF NEW YORK, N. Y.

DEVICE FOR PROJECTING THE DIFFERENT POSITIONS OF STARS.

Application filed April 21, 1925. Serial No. 24,777.

This invention relates to a device for projecting on a screen images of star constellations observed at various time periods and in various directions by astronomical observers and it is the principal object of the invention to provide an apparatus of this kind which will display images of the star constellations observed at certain times of the night and observed at each day of the month during the entire year, in their respective positions.

Another object of the invention is the provision of an apparatus of this character equipped with novel and improved means for holding, adjusting and locking two parts of unequal dimensions relatively to each other.

A further object of the invention is the provision of an apparatus of this type combined with means for shifting the projector to project any desired celestial direction, etc.

These and other objects and advantages of my invention will become more fully known as the description thereof proceeds, and will then be specifically defined in the appended claims.

In the accompanying drawing, forming a material part of this disclosure:

Fig. 1 is a front view of an apparatus constructed according to the present invention.

Fig. 2 is a side elevation thereof, partly in section.

Fig. 3 is a view seen when looking through the projector in the position illustrated in Fig. 4.

Fig. 4 is a perspective view of the plates with the stars on one plate, and the horizon on the other, and a fragmentary portion of the projector.

The apparatus may be used to

1. Show the apparent movement of the stars in their relative position with regard to the horizon.

2. To show the apparent movement of the stars and panorama for an observer looking around.

3. To show the apparent movement for an observer looking from the horizon up to the zenith according to the graduations representing the celestial directions and the hours and days of the year.

The apparatus comprises a sectional projector 10 and 10' through which a light may be directed, supported by a frame or bracket 11, to hold these parts in their relative positions. A circular guide disk 21 has an elongated aperture 21$^a$ which straddles the projector 10', and racks 14 and 15 are fixed to this disk 21 by the screws 21$^b$. The projector 10' has brackets 12 and 13 fixed to its sides, and abut against the racks 14 and 15 to guide these racks in vertical motion. Fixed on the top of the projector 10' is another bracket 12$^a$ which serves as a bearing for the shaft 18 carrying gears 16 and 17, which respectively mesh with said racks, and an operating knob wheel 19 is also fixed to said shaft 18. Turning the knob 19 will result in raising or lowering the disk 21 within the limits of the slot 21$^a$, but it should be noticed that the disk 21 is not revolvable, due of course to the abutting brackets 12 and 13.

On the periphery of the disk 21 a revolvable frame is mounted, consisting of circular block 39 having internal rack teeth 34, and plate 31 fastened to block 39 by screws 39$^a$. A bracket 37 is fixed to the disk 21, and supports a shaft 36 with a gear 35 meshing with the rack teeth 34 on one end, and on the other end an operating knob 38. Turning the knob 38 will result in the frame, consisting of parts 39 and 31, revolving about the guide disk 21.

On the periphery of the plate 31 another revolvable frame is mounted, consisting of circular block 25$^a$ having rack teeth 25 on its outer periphery, plate 24 fastened to the circular block 25$^a$ by screws 32, and plate 30 fastened to plate 24 by screws 42. A bracket 28 is fixed to plate 31 by screw 29, and operatively supports a gear 26 meshing with the rack teeth 25, and an operating knob 27. Turning the knob 27 results in the complete frame on the outer periphery of plate 31, which consists of parts 25$^a$, 24, and 30, revolving about 31.

At this stage of the disclosure an explanatory word or two is necessary. Hereafter the term "horizon plate" will be used to designate a transparent plate 23$^a$ having along its outer edge an opaque contour of a horizon 23$^b$ or a panoramic view and silhouette. This horizon is supposed to represent the horizon which one would see when standing in a certain place, and slowly turning around. Hereafter the term "star plate" will be used to designate a plate 22 having a uniform layer of blue or grey-green transparent color representing the sky, and dots left uncolored representing stars forming the various figures of the constellations.

The horizon plate 23 is held in a frame 33 which is secured to plate 31, and the star plate 22 is secured to plate 24. It should be noticed that both the star and horizon plates pass between the projectors 10, and 10'. The circular plate 25ª has arranged along the outer side graduations denoting the single days of the year, while graduations indicating the hours of the day are marked on plate 31 adjacent the former markings. Block 39 having inscriptions on its face denoting the direction of a compass in respect to the horizon plate.

Turn the knob 19 so that upon looking through the projectors, a portion of the horizon and the accompanying stars are seen, as shown in Figs. 3 and 4. This is the equivalent, say of an observer looking towards the south horizon, on a certain day at a certain hour. Manipulating knob 38 will result in both the horizon and star plate simultaneously turning, which is the equivalent of the observer turning his gaze away from the south horizon to either the east or west horizon, and this will show the other stars, on the different portions of the horizon on the same day and hour. Manipulating knob 27 will result in the star plate moving, while the horizon plate remains stationary. This is the equivalent of an observer watching the same horizon at different days or hours as indicated by the scales. And finally upon the manipulation of knob 19, the guide disk 21 may be projected upwards so that the horizon is moved off the vision of the projectors, which is equivalent to an observer looking from the horizon upwards, to the zenith according to the graduations representing the celestial directions, and the hours and days of the year.

It is to be understood that the form illustrated in the drawing is the preferred form of my device and that such changes may be made in the general arrangement and in the construction of the minor details as fall within the scope of the appended claims without departure from the spirit of my invention.

Having thus described my invention, what I claim as new, and desire to secure by Letters Patent, is:

1. An apparatus for projecting images of star constellations in their relative positions at any day and hour during the year, and in their relative celestial directions, comprising a frame supporting a projector, a panoramic view and silhouette horizon plate rotatably supported with a small portion thereof in the path of projection of said projector, panoramic view and silhouette horizon image means attached to said plate, a star constellation plate rotatably supported with a small portion thereof in the same path of projection of the said projector and the said horizon plate, star constellation image means attached to said constellation plate, and means for adjusting the relative positions of said plates with respect to each other, and both plates with respect to the path of projection of said projector.

2. An apparatus for projecting images of star constellations in their relative positions at any day and hour during the year, and in their relative celestial directions, comprising a frame supporting a projector, a panoramic view and silhouette horizon plate rotatably supported by a frame having inscriptions on its face denoting the direction of a compass in respect to the horizon, with a small portion thereof in the path of projection of said projector, panoramic view and silhouette horizon image means attached to said plate, a star constellation plate rotatably supported with a small portion thereof in the same path of projection of the said projector and the said horizon plate, star constellation image means attached to said constellation plate, and means for adjusting the relative positions of said plates with respect to each other, and both plates with respect to the path of projection of said projector.

3. An apparatus for projecting images of star constellations in their relative positions at any day and hour during the year, and in their relative celestial directions, comprising a frame supporting a projector, a panoramic view and silhouette horizon plate rotatably supported by a frame having inscriptions on its face denoting the direction of a compass in respect to the horizon, with a small portion thereof in the path of projection of said projector, panoramic view and silhouette horizon image means attached to said plate, a star constellation plate rotatably supported by a frame having graduations denoting the single days of the year, adjacent with graduations indicating the hours of the day which are marked on the horizon plate frame, with a small portion thereof in the same path of projection of the said projector and the said horizon plate, star constellation image means attached to said constellation plate, and means for adjusting the relative positions of said plates with respect to each other, and both plates with respect to the path of projection of said projector.

4. In an apparatus of the class described, a frame supporting a projector, a panoramic view and silhouette horizon plate rotatably supported with a small portion thereof in the path of projection of said projector, panoramic view and silhouette horizon image means attached to said plate, a star constellation plate rotatably supported with a small portion thereof in the same path of projection of the said projector and the said horizon plate, star constellation image means attached to said constellation plate, and means for adjusting the relative positions of said plates with respect to each other, and both plates with respect to the path of projection of said projector, to show the apparent movement of the stars, and panorama for an observer looking around.

5. In an apparatus of the class described, a frame supporting a projector, a panoramic view and silhouette horizon plate rotatably supported by a frame having inscriptions on its face denoting the direction of a compass in respect to the horizon, with a small portion thereof in the path of projection of said projector, panoramic view and silhouette horizon image means attached to said plate, a star constellation plate rotatably supported with a small portion thereof in the same path of projection of the said projector and the said horizon plate, star constellation image means attached to said constellation plate, and means for adjusting the relative positions of said plates with respect to each other, and both plates with respect to the path of projection of said projector, to show the apparent movement of the stars in their relative position with regard to the horizon.

6. In an apparatus of the class described, a frame supporting a projector, a panoramic view and silhouette horizon plate rotatably supported by a frame having inscriptions on its face denoting the direction of a compass in respect to the horizon, with a small portion thereof in the path of projection of said projector, panoramic view and silhouette horizon image means attached to said plate, a star constellation plate rotatably supported by a frame having graduations denoting the single days of the year, adjacent with graduations indicating the hours of the day which are marked on the horizon plate frame, with a small portion thereof in the same path of projection of the said projector and the said horizon plate, star constellation image means attached to said constellation plate, and means for adjusting the relative positions of said plates with respect to each other, and both plates with respect to the path of projection of said projector, to show the apparent movement for an observer looking from the horizon up to the zenith according to the graduations representing the celestial directions, and the hours and days of the year.

In testimony whereof I have affixed my signature.

PAUL W. CHARTON.